United States Patent [19]

Roh

[11] Patent Number: 4,993,541
[45] Date of Patent: Feb. 19, 1991

[54] TRIPLE CONVEYOR
[76] Inventor: Jae Y. Roh, 493 Shinpwong-Dong, Saha-Ku, Pusan, Rep. of Korea
[21] Appl. No.: 352,255
[22] Filed: May 16, 1989
[51] Int. Cl.⁵ .............................................. B65G 13/07
[52] U.S. Cl. ..................................... 198/781; 198/790
[58] Field of Search ................ 198/780, 781, 789, 790

[56] References Cited
U.S. PATENT DOCUMENTS

| 2,976,981 | 3/1961 | Peras | 198/781 |
| 4,193,493 | 3/1980 | Ekstrand | 198/781 |
| 4,215,775 | 8/1980 | Gebhardt | 198/781 |
| 4,221,288 | 9/1980 | Rae | 198/781 |
| 4,325,474 | 4/1982 | Rae | 198/781 |
| 4,366,899 | 1/1983 | Doro | 198/781 |
| 4,421,224 | 12/1983 | Dingman | 198/781 |
| 4,469,220 | 9/1984 | Becker | 198/781 |
| 4,524,861 | 6/1985 | Matsushita | 198/781 |
| 4,706,801 | 11/1987 | Vessey | 198/781 |
| 4,781,283 | 11/1988 | Bentley et al. | 198/781 X |

FOREIGN PATENT DOCUMENTS

| 0264254 | 4/1988 | European Pat. Off. | 198/781 |
| 0621616 | 8/1978 | U.S.S.R. | 198/70 |
| 1221081 | 3/1986 | U.S.S.R. | 198/781 |
| 1173629 | 12/1969 | United Kingdom | 198/781 |

Primary Examiner—H. Grant Skaggs
Assistant Examiner—D. Glenn Dayoan
Attorney, Agent, or Firm—Birch, Stewart, Kolasch & Birch

[57] ABSTRACT

A triple conveyor includes a chain gear, a coaxial roller, and end wheels of a coaxle whereby the conveyor can transport products quickly and accurately, and reduce the noise and vibration of the conveyor so as to allow for the use of robots and the elimination of manpower in the factory.

3 Claims, 3 Drawing Sheets

FIG. I
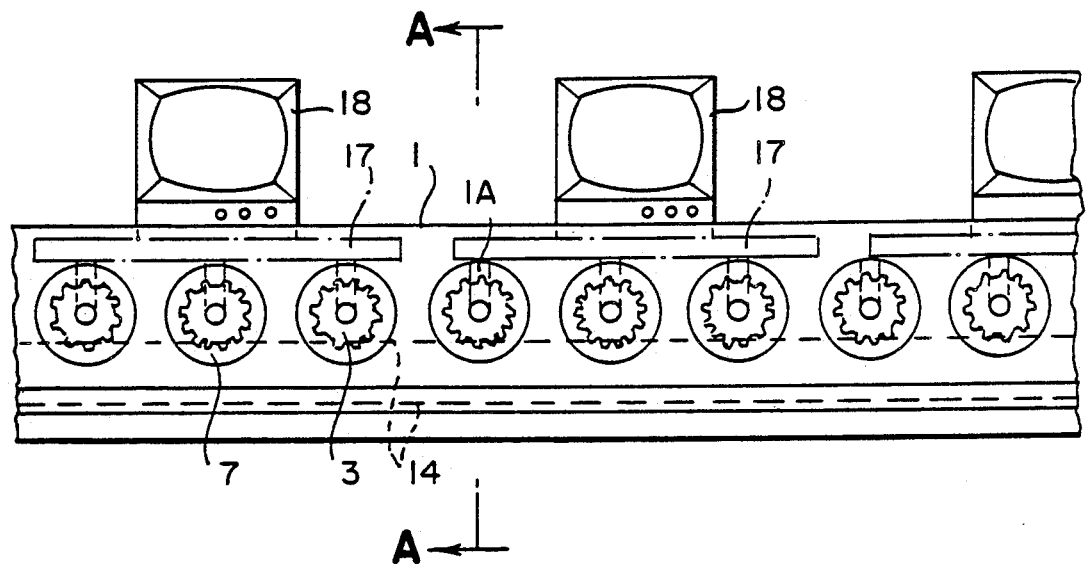
FIG. 4
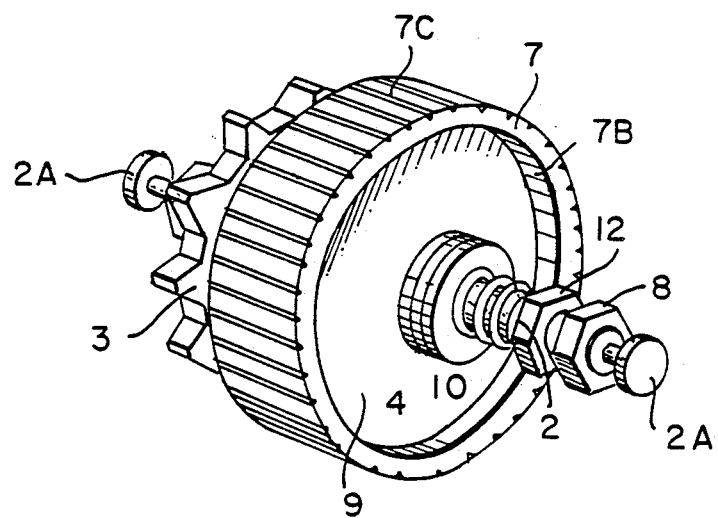

TRIPLE CONVEYOR

BACKGROUND OF THE INVENTION

1. Field of the Invention

The present invention relates to a triple conveyor and more particularly, to a conveyor including a chain gear, a coaxial roller, and end wheels of a coaxle which can transport products quickly and accurately, and reduce the noise and vibration of the conveyor so as to allow for the use of robots in place of manpower in the factory.

2. Description of the Prior Art

In a conventional conveyor, a plurality of spaced rollers are fixed to a chain which moves forward on an endless track. Accordingly, the rollers move forward together with the chain to transport each pallet on which a product is loaded. Such a transport mechanism makes a large noise due to friction among drive members, and vibration between the pallet and the rollers. Therefore, the vibration causes many problems in operations using robots in place of manpower. Moreover, such a noise annoys a worker and deteriorates the working environment.

Another conventional conveyor which includes a roller which does not move forward with the chain. The roller just revolves at a stationary position to reduce noise and vibration. However, since the roller is formed integrally with the sprocket, revolution speed of the roller is constant and cannot be promptly adjusted according to the transport conditions. Therefore products cannot be moved quickly to increase the production efficiency.

According to the U.S. patent application, Ser. No. 07/290,255 entitled "Power Free Triple Conveyor" owned by the inventor of the present application, a conveyor is disclosed which includes a sprocket mounted on the each shaft through a bearing, a roller separately formed and freely rotated on the sprocket and having a plurality of springs holes, a plurality of springs resiliently installed within the holes of the roller, a pair of friction plates and snap rings located adjacent to the roller, and a guide rail fixed at the upper portion of the frame. The plurality of springs resiliently installed within the holes suffer from some problems. For example, it is difficult to meet the requirement of having all the springs within the holes of the roller exhibiting equal resilient force, to replace old springs with new springs, and for the springs to maintain their original form when the roller slips from the friction plate.

In order to eliminate the disadvantages mentioned above, according to the present invention, the conveyor includes a chain gear, a coaxial roller having a plurality of longitudinal slots, and fixed end wheels of a coaxle for slidably, rotatably engaging with receiving grooves disposed in a frame.

SUMMARY OF THE INVENTION

Accordingly, it is an object of the present invention to provide a triple conveyor which can reduce noise and vibration between drive members and transport products quickly and accurately and which can be adapted for use with robots to eliminate manpower.

Another object of the present invention is to provide an improved conveyor which includes a chain gear, a coaxial roller having a plurality of longitudinal slots, and fixed end wheels of a coaxle whereby the chain gear and roller smoothly rotate, and the noise between the roller and each pallet on which a product is loaded can be reduced.

A further object of the present invention is to provide an improved conveyor which is simple in construction, inexpensive to manufacture, durable in use, and refined in appearance.

Other objects and further scope of applicability of the present invention will become apparent from the detailed description given hereinafter. It should be understood, however, that the detailed description and specific examples, while indicating preferred embodiments of the invention, are given by way of illustration only, since various changes and modifications within the spirit and scope of the invention will become apparent to those skilled in the art from this detailed description.

Briefly described, the present invention relates to a power free triple conveyor which includes a chain gear, a coaxial roller, and end wheels of a coaxle whereby the conveyor can transport products quickly and accurately, and the reduce noise and vibration of the conveyor so as to allow for the use of robots in the factory.

BRIEF DESCRIPTION OF THE DRAWINGS

The present invention will become more fully understood form the detailed description given hereinbelow and the accompanying drawings which are given by way of illustration only, and thus are not limitative of the present invention, and wherein:

FIG. 1 is a schematic side view illustrating the conveyor line according to the present invention, to transport products thereon;

FIG. 4 is a perspective view of basic components of the conveyor according to the present invention.

DESCRIPTION OF THE PREFERRED EMBODIMENTS

Figure 2:
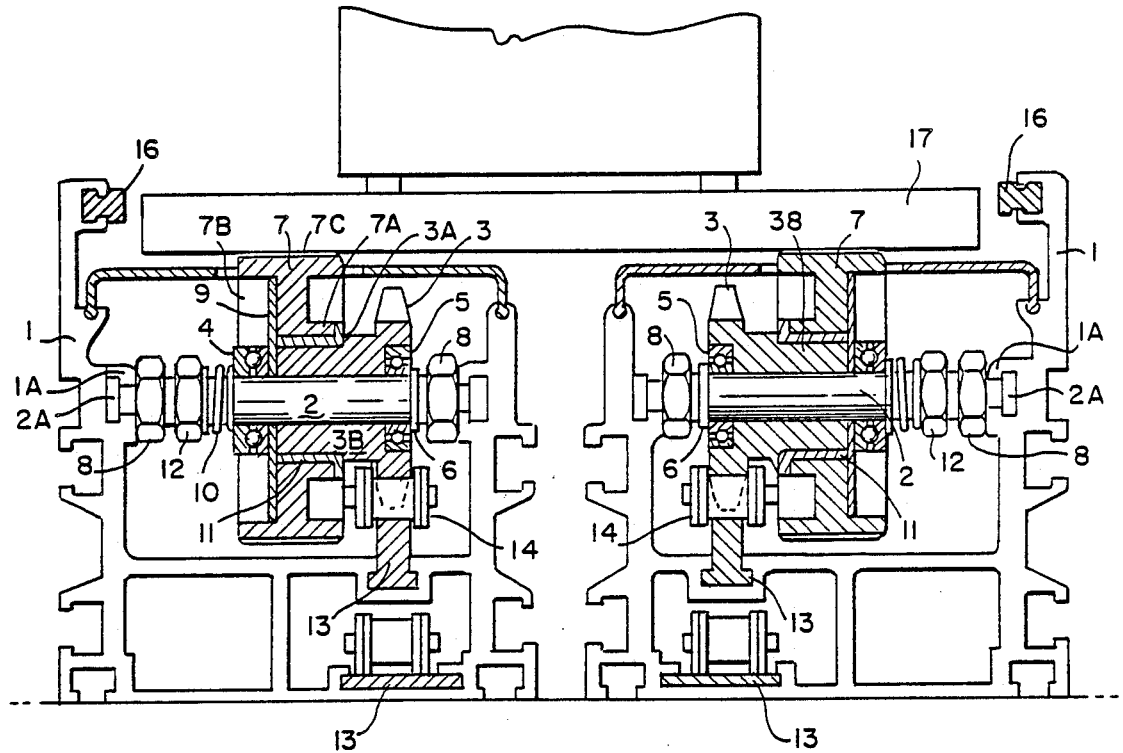
FIG. 2 is a front view of the conveyor according to the present invention, showing in cut away portions thereof rollers and chain gears.
Figure 3:
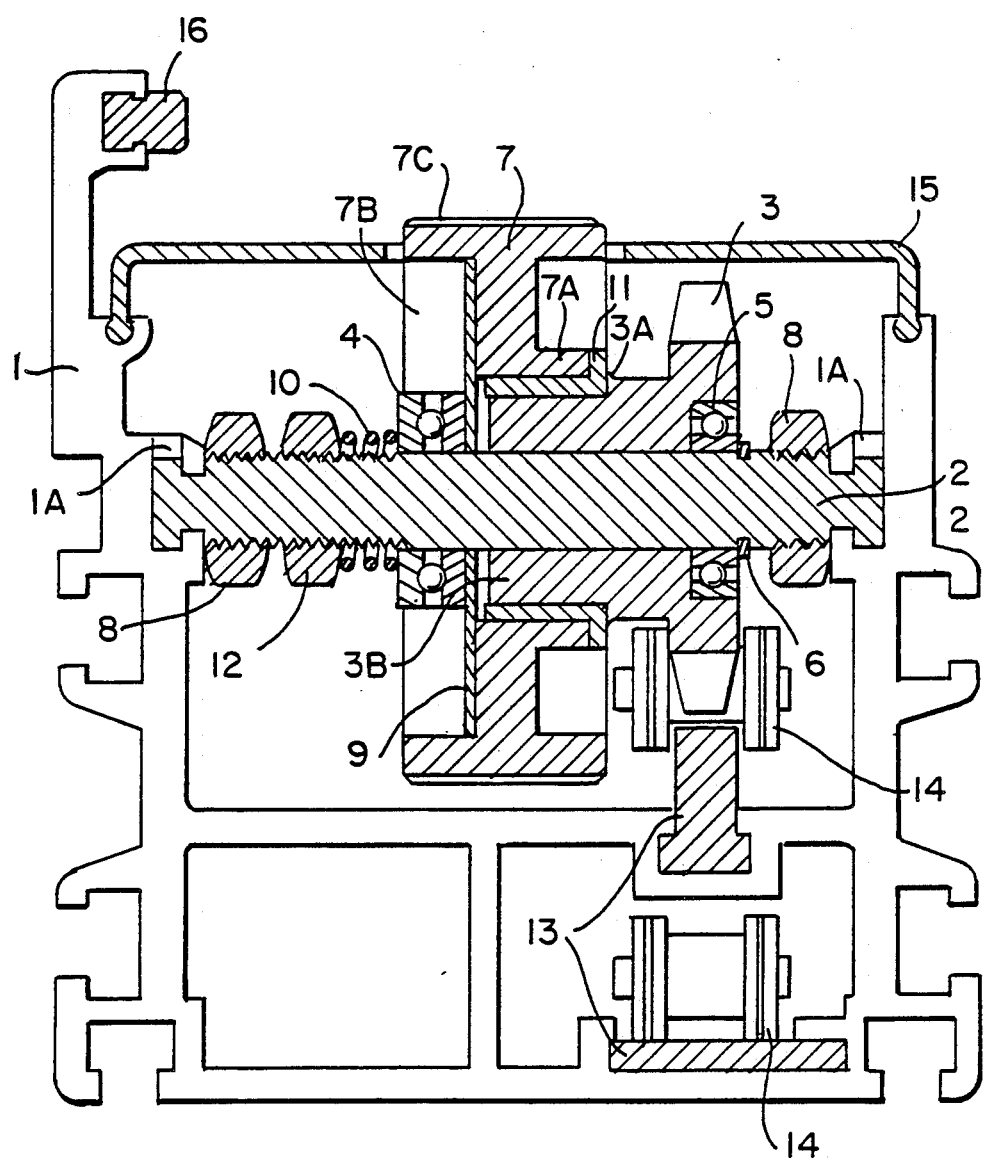
FIG. 3 is a sectional view of FIG. 1, taken along line A—A.

Referring now in detail to the drawings for the purpose of illustrating preferred embodiments of the present invention, a triple conveyor as shown in FIGS. 1, 2, and 3 includes a pair of frames 1 extending longitudinally and spaced apart, a plurality of chain gears 3 mounted on each main shaft 2 which is rotatably connected to the frames 1, a plurality of coaxial rollers 7, and a chain 14 which connects each chain gear 3 and rotates in the form of an endless track through a chain guide rail 13.

The pair of frames 1 are provided with a plurality of a pair of receiving slots 1A for smoothly receiving a pair of end wheels 2A attached to both ends of the main shaft 2. The pair of frames 1 are further provided with a chain cover 15 for covering the chain 14 passed along the chain guide rail 13.

Each main shaft 2 is mounted to a chain shaft 3B of the chain gear 3 through bearings 5. The chain shaft 3B includes an annular chain slot 3A for rotatably receiving the chain 14. And the chain shaft 3B is used as a shaft for the roller 7. Accordingly, the roller 7 is provided with a raised tubular stem 7A at one side thereof for tightly fixing to the chain shaft 3B through a circumferential, raised bush 11. The roller 7 is provided with a hollow portion 7B at the other side thereof for slidably attaching a plate washer 9 and a bearing housing 4 having bearings 5 therein (FIG. 3). The bush 11 and the plate washer 9 may be used as a friction buffer member for reducing noise and vibration of the conveyor.

As shown in FIGS. 1 and 4, the chain gear 3 contains a plurality of teeth which are engaged with the chain 14 which moves in the form of an endless track within the frames 1. The main shaft 2 is mounted with a spring 10, an adjusting nut 12, and a fixing nut 8 from the bearing housing 4 to one end wheel 2A disposed at the roller side for reducing the noise and vibration of the conveyor.

The roller 7 contains a plurality of longitudinal slots 7C disposed on the outer surface thereof for slidably rotating against a pallet 17 and moving the pallet 17 forward as well as preventing the pallet 17 from slipping. The pallet 17 is adapted to carry a product 18, such as for example a TV frame, and moves forward together with the product (FIG. 1). Therefore, the conveyor of the present invention can transport the products quickly and accurately, and reduces the noise and vibration of the conveyor so as to allow for the use of robots and the elimination of manpower in the factory.

Thus the pallet 17 on which the product 18 is load is laid on the upper surface of the roller 7, and moves forward in response to the revolution of the roller 7. The chain guide rail 13 supports the chain 14 and enables the chain 14 to it move smoothly as it extends longitudinally along the frames 1.

At the upper portion of the frames 1 another guide rail 16 is provided which is made of synthetic resins. The guide rail 16 prevents the pallet 17 from deviating from its transport direction.

In operation, when the chain 14 moves forward along the guide rail 13 by the driving force from a motor (not shown), the chain gear 3 rotates freely on the main shaft 2. Accordingly the roller 7, which is assembled to the main shaft 2 through the chain shaft 3B, the bush 11, the plate washer 9, the bearing housing 4, the spring 10, the adjusting nut 12, and the fixing nut 8, rotates smoothly at the stationary position together with the chain gear 3.

The product 18 loaded on the pallet 17 moves forward in the downstream direction of the conveyor line. At this time, the pallet 17 which is in rolling contact with the roller 7, is transported in a straight and even manner because the guide rail 16 supports the pallet 17 so as to maintain its transport direction.

Therefore, the noise and vibration produced between the drive members are remarkably reduced when compared with the conventional conveyor. When an operator or robot wants to stop the pallet 17 and to assembly supplementary components to the product 18, a stopper (not shown) operates to clamp the pallet 17. At this time, the pallet 17 is stopped at a stationary position, but the roller 7 and the chain gear 3 continues rotating.

After the assembly of the supplementary components is finished by the operator or robots, the stopper release the pallet 17 and rests the pallet 17 on the roller 7. Accordingly, the pallet 17 resumes moving forward to the next working station, i.e. the downstream direction of the conveyor line.

When the conveyor line becomes overloaded, the plate washer 9 stops the rotation of the roller 7 and the forward movement of the pallet 17. Therefore, the roller 7 cannot revolve but the chain gear 3 continues rotating. Accordingly, the pallet 17 cannot move forward and is maintained at its stationary position until the conveyor line is not overloaded.

At this time, the adjusting nut 12 may be controlled by the operator for adjusting the resilient force of the spring 10 so as to selectively tightly attach the roller 7 to the chain gear 3. Therefore, if necessary, the operator may adjust the adjusting nut 12 for adjusting the number of revolutions and rotating power of the roller 7. Also the transport speed of the pallet 17 can be adjusted by the adjustment of the adjusting nut 12 for the roller 7 and the chain gear 3.

On the other hand, since each roller 7 is mounted on the main shaft 2 through the bearing 5, excellent rotation conditions for the roller 7 can be acquired with small power. Also electrical error owing to the vibration between the drive members is remarkably reduced because the roller 7 rotates in a stationary position.

The guide rail 16 guides the pallet 17, which carries the product thereon, so that the pallet 17 moves in a straight manner and does not deviate from its transport direction. Therefore, each pallet 17 moves quietly without a jolt and stops quickly so that tact time can be shortened and productivity can be increased.

The conveyor in accordance with the present invention can be modified to various forms, for example, the pair of the frames 1, which are parallel and separately formed in the present invention, can be formed integrally with each other. The roller 7 and the shaft 5 can also be extended transversely to the entire width of the frames 1.

The conveyor in accordance with the present invention can solve the problems which accompany the conventional conveyors, and increase the production efficiency of factory operations which use robots.

The invention being thus described, it will be obvious that the same may be varied in many ways. Such variations are not to be regarded as a departure from the spirit and scope of the invention, and all such modifications as would be obvious to one skilled in the art are intended to be included in the scope of the following claims.

What is claimed is:
1. A triple conveyor comprising:
a housing member,
a main shaft member mounted in said housing member,
a chain gear extending from a chain shaft, said chain shaft being coaxially mounted on said main shaft member, said chain shaft being provided with a raised bushing,
a roller member coaxially mounted on said chain shaft through an inter-position of said raised bushing, said roller member combining three roller members,
a plate washer coaxially mounted on said main shaft member and extending along a lateral side of said coaxial roller member,
bearing housing coaxially mounted on said main shaft member adjacent said plate washer, said bearing housing containing bearings disposed therein for slidably attaching to said plate washer inserted into a hollow portion of said roller member,
spring means coaxially mounted on said main shaft adjacent said bearing housing,
a plurality of pallets supported by said three roller members, said pallets carrying a product thereon to be transported along said conveyor,
an adjusting nut mounted on said main shaft for adjusting the resiliency of said spring means, and a fixing nut mounted to said main shaft member next to said adjusting nut, whereby, when a chain connected to the chain gear moves forward along a guide rail by a driving force from a motor, the chain gear and the roller member rotate simultaneously and the pallet carrying a product thereon is moved forward in the downstream direction of a conveyor line so that the conveyor can transport the product quickly and accurately, and reduce noise and vibration of the conveyor since the roller member is slidably attached to the chain shaft through said raised bushing and said bearing housing slidably confronts the plate washer.

2. The triple conveyor of claim 1, wherein the chain shaft is attached to said main shaft member through said bearings.

3. The triple conveyor of claim 1, wherein a pair of frames is provided with a pair of receiving slots for slidably receiving end wheels of said main shaft member.

* * * * *